United States Patent [19]

Hicks

[11] Patent Number: 4,488,566
[45] Date of Patent: Dec. 18, 1984

[54] THERMALLY RESPONSIVE SLAM SHUT VALVE ASSEMBLY

[75] Inventor: Irwin A. Hicks, Radnor, Pa.

[73] Assignee: The Singer Company, Stamford, Conn.

[21] Appl. No.: 506,953

[22] Filed: Jun. 22, 1983

[51] Int. Cl.³ ............................................. F16K 17/00
[52] U.S. Cl. ...................................... 137/74; 137/75; 137/515.7; 137/542
[58] Field of Search ................. 137/75, 74, 457, 517, 137/542, 543, 543.13, 515.7, 515; 122/504.1; 220/89 B

[56] References Cited

U.S. PATENT DOCUMENTS

| | | |
|---|---|---|
| 288,271 | 11/1883 | Stearns . |
| 466,022 | 12/1891 | Rice . |
| 1,956,858 | 5/1934 | Densten . |
| 2,903,005 | 9/1959 | Anderson et al. . |
| 3,877,476 | 4/1975 | Mills ................................. 137/75 |

FOREIGN PATENT DOCUMENTS

| | | | |
|---|---|---|---|
| 2234501 | 1/1975 | France ................................. 137/75 |
| 204381 | 5/1966 | Sweden ................................. 137/75 |
| 964835 | 7/1964 | United Kingdom ................. 137/75 |

Primary Examiner—Alan Cohan
Attorney, Agent, or Firm—David L. Davis; Robert E. Smith; Edward L. Bell

[57] ABSTRACT

A thermally responsive slam shut valve assembly includes a generally tubular body member having an internal valve seat at one end, a spider member connected to the other end of the body member, a cup shaped valve inside the body member, a valve stem connected to the valve and extending through a central opening in the spider member, a coil spring surrounding the stem between the valve and the spider member, and fusible means surrounding the stem outside the body member for preventing the valve from moving into sealing contact with the valve seat until the temperature of the fusible means goes above a predetermined threshold.

3 Claims, 4 Drawing Figures

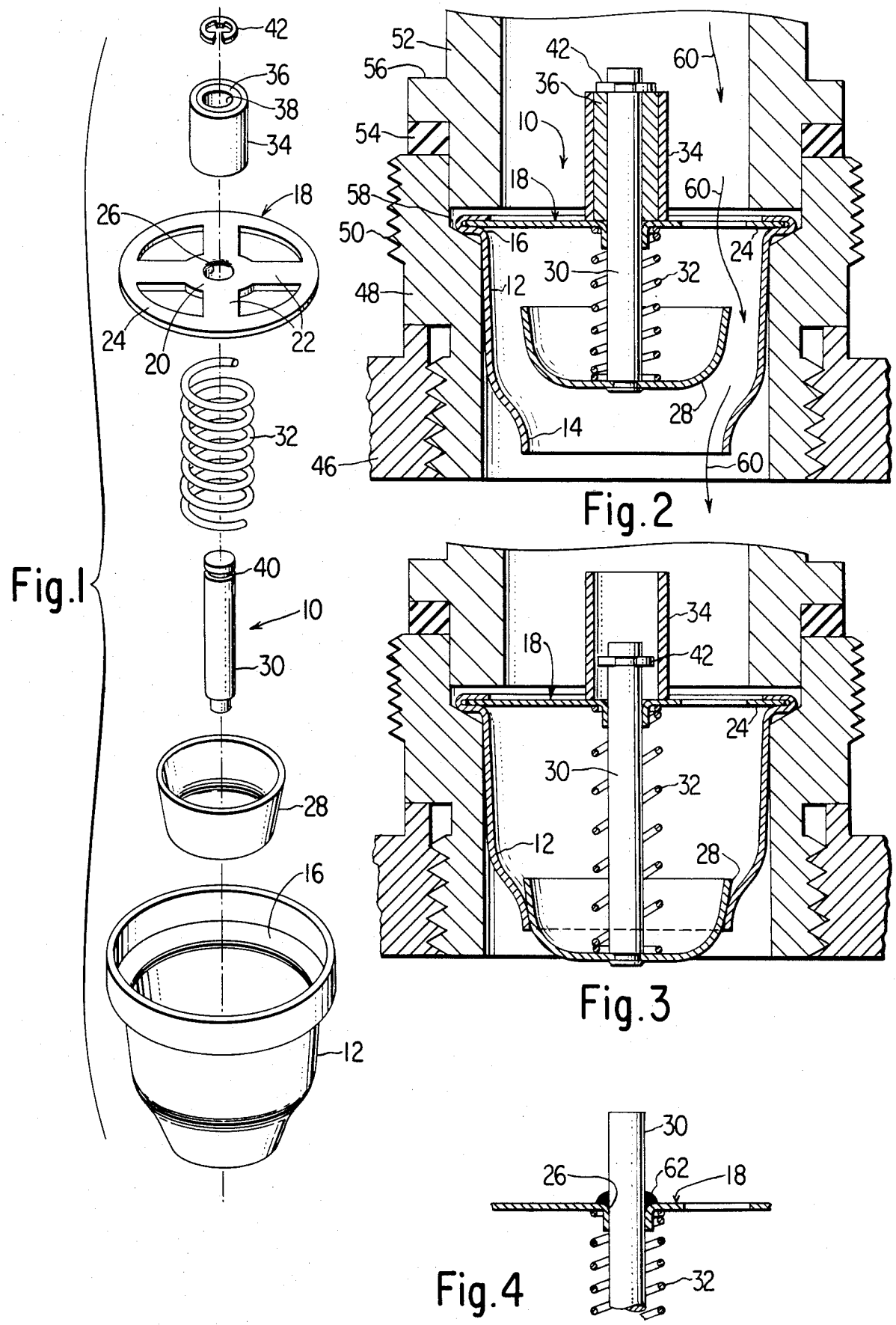

THERMALLY RESPONSIVE SLAM SHUT VALVE ASSEMBLY

DESCRIPTION

BACKGROUND OF THE INVENTION

This invention relates to safety apparatus and, more particularly, to a thermally responsive slam shut valve assembly.

In a building connected to a gas line, there is always the danger of a fire. The heat of the fire can cause the failure of non-metallic parts, such as diaphragms, in meters or regulators in the line. The failure of these parts causes a dramatic increase in the gas flow rate, feeding the fire and raising the temperature to such an extent as to cause the burning the subsequent total failure of the meter or regulator, which is typically constructed of aluminum. It is therefore an object of this invention to provide an arrangement sensitive to elevated temperatures for shutting off the flow of gas in a gas line prior to such failure.

There have been a number of attempts in the past to provide such an arrangement whereby a fusible link holds a valve member in the open position until the temperature rises to such an extent that the link softens to allow the valve to close. See, for example, U.S. Pat. Nos. 288,271; 466,022; 1,956,858; and 2,903,005. However, all of these arrangements require some modification to the existing gas line and/or connections. It is therefore another object of this invention to provide a thermally responsive slam shut value assembly which does not require any modification to the gas line and/or connection in which the assembly is installed.

SUMMARY OF THE INVENTION

The foregoing and additional objects are attained in accordance with the principles of this invention by providing a thermally responsive slam shut valve assembly comprising a generally tubular body member having an internal valve seat at one end and an outwardly extending flange at the other end, a spider member having a central hub and a plurality of webs extending radially outward from the hub to the outer periphery of the spider member, the outer periphery of the spider member resting on and connected to the flange and the hub having an opening therethrough, a cup shaped valve inside the body member, a valve stem connected to the valve and extending through the hub opening, a coil spring surrounding the stem between the valve and the hub and acting to bias the valve toward the valve seat, and fusible means surrounding the stem on the side of the hub opposite the valve for preventing the valve from moving into sealing contact with the valve seat when the temperature of the fusible means is below a predetermined threshold, the fusible means softening to allow the valve to move into sealing contact with the valve seat when the temperature of the fusible means goes above the predetermined threshold.

BRIEF DESCRIPTION OF THE DRAWINGS

The foregoing will be more readily apparent upon reading the following description in conjunction with the drawings in which like elements in different figures thereof have the same reference character applied thereto and wherein:

FIG. 1 is an exploded perspective view of a thermally responsive slam shut valve assembly constructed in accordance with the principles of this invention;

FIG. 2 is a longitudinal cross-sectional view showing the assembly of FIG. 1 installed in a meter inlet connection with the valve in the open condition;

FIG. 3 is a longitudinal sectional view similar to FIG. 2 but with the valve in the closed condition; and FIG. 4 is a detailed view showing a modification to the assembly shown in FIGS. 1–3.

DETAILED DESCRIPTION

Referring now to the drawings, FIG. 1 is an exploded perspective view of a thermally responsive slam shut valve assembly, designated generally by the reference numeral 10, constructed in accordance with the principles of this invention. The assembly 10 includes a generally tubular body member 12 shaped to have an internal valve seat 14 at one end and an outwardly extending flange 16 at the other end. The assembly 10 also includes a spider member 18 having a central hub 20 and a plurality of webs 22 extending radially outward from the hub 20 to the outer periphery 24 of the spider member 18. The hub 20 is formed with an opening 26 therethrough. As shown in FIGS. 2 and 3, the outer periphery 24 of the spider member 18 rests on the flange 16 of the body member 12. Preferably, the outer periphery 24 is captured by an inwardly folded portion of the flange 16 being crimped over the outer periphery 24.

The assembly 10 also includes a cup shaped valve 28 inside the body member 12. The valve 28 is connected to a valve stem 30 which extends through the opening 26 in the hub 20 of the spider member 18. A coil spring 32 surrounds the stem 30 between the valve 28 and the hub 20 of the spider member 18 and acts to bias the valve 28 away from the spider member 18 and toward the valve seat 14.

The assembly 10 further includes a hollow sleeve 34 filled with fusible material 36 having a melting point of approximately 250° Fahrenheit. The fusible material 36 is formed with a central bore 38 of sufficient size to accept the stem 30 therethrough. The end of the stem 30 opposite the valve 28 is formed with a circumferential groove 40 into which a retaining clip 42 is inserted after the stem 30 is passed through the bore 38. The internal diameter of the sleeve 34 is larger than the retaining clip 42 so the only thing that prevents the valve 28 from moving into sealing contact with the valve seat 14 is the presence of the fusible material 36.

After the aforedescribed structure is assembled as a unit, it may then be installed in a gas line. FIG. 2 illustrates such installation at the inlet side of a gas meter. (The same manner of installation also holds for a gas regulator.) Thus, as shown in FIG. 2, the meter top 46 has a gas inlet connector 48 connected thereto, as by threads or the like. The connector 48 has external threads 50. A swivel connection 52 is supported on a gasket 54 and an internally threaded retaining ring (not shown) cooperates with the shoulder 56 and the threads 50 to secure the swivel connection 52 to the inlet connector 48, as is well known in the art. Before the swivel connection 52 is installed, the slam shut valve assembly 10 is inserted with a light press fit into the connector 48 so that the flange 16 of the body member 12 rests on the shoulder 58 of the connector 48. As shown by the arrows 60, gas passes only through the openings between the webs 22 of the spider member 18 and through the valve seat 14 and not around the outside of the unit 10.

In the event of fire, the fusible material 36 within the sleeve 34 softens sufficiently to allow the retaining clip 42 to pass through the sleeve 34 when the force of the spring 32, aided by the gas flow, moves the valve 28 against the valve seat 14, thereby shutting off the gas flow through the meter or regulator, as illustrated in FIG. 3.

FIG. 4 illustrates a modification to the aforedescribed construction where the fusible material 62 is a low temperature solder directly applied to the outside of the stem 30 around the opening 26 of the spider member 18.

The aforedescribed arrangement has the advantage that the valve unit 10 is completely assembled away from its place of installation and then is easily installed without any modification to the meter or regulator being required. Thus, meters and regulators presently in the field may have this safety feature added thereto.

Accordingly, there has been disclosed a improved thermally responsive slam shut valve assembly. It is understood that the above-described embodiments are merely illustrative of the application of the principles of this invention, and it is only intended that this invention be limited by the scope of the appended claims.

I claim:

1. A self-contained thermally responsive slam shut valve assembly adapted for installation in the inlet connector of a gas meter or the like, said connector having a constant diameter portion and an enlarged shoulder region adjacent said portion and away from said meter, said assembly comprising:

a generally tubular body member having an internal valve seat at one end and an outwardly extending flange at the other end, said body member being sized to be press fit into said constant diameter portion of said connector with said flange resting on said shoulder region;

a spider member having a central hub and a plurality of webs extending radially outward from said hub to the outer periphery of said spider member, the outer periphery of said spider member resting on and connected to said flange and said hub having an opening therethrough;

a cup shaped valve inside said body member;

a valve stem connected to said valve and extending through said hub opening;

a coil spring surrounding said stem between said valve and said hub and acting to bias said valve toward said valve seat; and fusible means surrounding said stem on the side of said hub opposite said valve for preventing said valve from moving into sealing contact with said valve seat when the temperature of said fusible means is below a predetermined threshold, said fusible means softening to allow said valve to move into sealing contact with said valve seat when the temperature of said fusible means goes above said predetermined threshold.

2. The assembly according to claim 1 wherein said stem is formed with a circumferential groove near the end opposite said valve and said fusible means includes:

a hollow sleeve surrounding said stem;

fusible material filling said sleeve outside said stem; and a retaining clip captured in said groove, the internal diameter of said sleeve being larger than said retaining clip.

3. The assembly according to claim 1 wherein said flange is folded inwardly and crimped over the outer periphery of said spider member.

* * * * *